(12) United States Patent
Lastinger et al.

(10) Patent No.: US 7,400,860 B2
(45) Date of Patent: Jul. 15, 2008

(54) METHOD AND APPARATUS FOR INCREASING DATA THROUGHPUT

(75) Inventors: Roc Lastinger, Cave Creek, AZ (US); John Spenik, Phoenix, AZ (US); Brian C. Woodbury, Gilbert, AZ (US)

(73) Assignee: Rotani, Inc., Scottsdale, AZ (US)

( * ) Notice: Subject to any disclaimer, the term of this patent is extended or adjusted under 35 U.S.C. 154(b) by 205 days.

(21) Appl. No.: 11/420,605

(22) Filed: May 26, 2006

(65) Prior Publication Data

US 2006/0270351 A1    Nov. 30, 2006

Related U.S. Application Data

(63) Continuation-in-part of application No. 10/869,201, filed on Jun. 15, 2004, now Pat. No. 7,302,278, which is a continuation-in-part of application No. 10/880,387, filed on Jun. 29, 2004, now Pat. No. 7,359,675.

(60) Provisional application No. 60/692,490, filed on Jun. 21, 2005, provisional application No. 60/743,897, filed on Mar. 29, 2006.

(51) Int. Cl.
*H04B 1/00* (2006.01)
*H04Q 7/20* (2006.01)

(52) U.S. Cl. .................. 455/63.3; 455/63.4; 455/67.13

(58) Field of Classification Search ............... 455/63.1, 455/63.3, 63.4, 67.11, 67.13, 452.1, 452.2, 455/562.1
See application file for complete search history.

(56) References Cited

U.S. PATENT DOCUMENTS

| 5,212,930 | A |   | 5/1993  | Raudat et al. |
| 5,606,727 | A | * | 2/1997  | Ueda ............ 455/513 |
| 5,771,449 | A |   | 6/1998  | Blasing |
| 6,104,935 | A |   | 8/2000  | Smith et al. |
| 6,229,486 | B1 |  | 5/2001  | Krile |
| 6,272,337 | B1 |  | 8/2001  | Mount et al. |
| 6,278,723 | B1 |  | 8/2001  | Meihofer |
| 6,304,762 | B1 |  | 10/2001 | Myers et al. |
| 6,400,955 | B1 |  | 6/2002  | Kawabata |
| 6,405,058 | B2 |  | 6/2002  | Bobier |
| 6,463,301 | B1 |  | 10/2002 | Bevan |
| 6,470,195 | B1 |  | 10/2002 | Meyer |
| 6,486,832 | B1 |  | 11/2002 | Abramov |
| 6,505,045 | B1 |  | 1/2003  | Hills |
| 6,531,985 | B1 |  | 3/2003  | Jones |
| 6,560,443 | B1 |  | 5/2003  | Vaisanen |
| 6,690,657 | B1 |  | 2/2004  | Lau |
| 2001/0046866 | A1 | | 11/2001 | Wang |

(Continued)

FOREIGN PATENT DOCUMENTS

WO    WO03/023895    5/2003

(Continued)

*Primary Examiner*—Lee Nguyen
(74) *Attorney, Agent, or Firm*—Letham Law Firm LLC; Lawrence Letham

(57) ABSTRACT

Methods and apparatus for using primary direction of data flow to increase data throughput are disclosed. A wireless cell and/or client detects noise sources, detects the channels used by the noise sources, determines the primary direction of data flow, and selects a channel for communication between the wireless cell and client that reduces noise source interference with the primary direction of data flow.

22 Claims, 7 Drawing Sheets

U.S. PATENT DOCUMENTS

| | | |
|---|---|---|
| 2002/0019233 A1 | 2/2002 | Leung |
| 2002/0077152 A1 | 6/2002 | Johnson et al. |
| 2002/0197984 A1 | 12/2002 | Monin et al. |
| 2003/0002442 A1 | 1/2003 | Flammer |
| 2003/0087645 A1 | 5/2003 | Kim |
| 2003/0109285 A1 | 6/2003 | Reed |
| 2003/0125089 A1 | 7/2003 | Pederson |
| 2003/0181180 A1 | 9/2003 | Darabi |
| 2003/0210665 A1 | 11/2003 | Salmenkaita et al. |
| 2004/0009791 A1 | 1/2004 | Hiramatsu |
| 2004/0106412 A1 | 6/2004 | Laroia et al. |
| 2004/0196834 A1 | 10/2004 | Ofek et al. |
| 2005/0037766 A1* | 2/2005 | Hans et al. .................. 455/450 |
| 2005/0070294 A1 | 3/2005 | Lyle et al. |

FOREIGN PATENT DOCUMENTS

| | | |
|---|---|---|
| WO | WO2005/039225 | 4/2005 |

* cited by examiner

METHOD AND APPARATUS FOR INCREASING DATA THROUGHPUT

CROSS-REFERENCE TO RELATED APPLICATIONS

This application is a continuation-in-part of, claims priority to, and the benefit of, U.S. patent application Ser. No. 10/869,201, filed on Jun. 15, 2004 now U.S. Pat. No. 7,302,278, and U.S. patent application Ser. No. 10/880,387, filed on Jun. 29, 2004 now U.S. Pat. No. 7,359,675, both of which are hereby incorporated by reference in their entirety. This application also claims priority to, and the benefit of, U.S. provisional patent application Ser. No. 60/692,490, filed on Jun. 21, 2005 and U.S. provisional patent application Ser. No. 60/743,897, filed on Mar. 29, 2006, both of which are hereby incorporated by reference in their entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever.

BACKGROUND OF THE INVENTION

1. Field of the Invention

This invention generally relates to wireless communications, and more particularly, to apparatus and methods configured to increase data throughput for wireless cells, wireless clients, and wireless networks.

2. Description of Related Art

Many systems incorporate communication protocols, minimally interfering channels, and directional antennas to improve communication between wireless cells and wireless clients. To further improve data throughput, wireless devices could benefit from detecting and using the primary direction of data flow to select an antenna and/or a channel.

BRIEF SUMMARY OF THE INVENTION

The invention overcomes the limitations and problems of the prior art by providing methods and apparatus for using a primary direction of data flow to select a directional antenna and/or a channel to improve data throughput. In one embodiment, directional antennas decrease noise interference when data flows primarily in a predetermined direction. In another embodiment, wireless devices with omni-directional antennas select a channel according to a primary direction of data flow to improve data throughput. In another embodiment, wireless devices with directional antennas select a channel according to a primary direction of data flow to improve data throughput.

BRIEF DESCRIPTION OF THE SEVERAL VIEWS OF THE DRAWING(S)

A more complete understanding of the present invention may be derived by referring to the detailed description and claims when considered in connection with the Figures, wherein like reference numbers refer to similar elements throughout the Figures, and:

Figure 14:
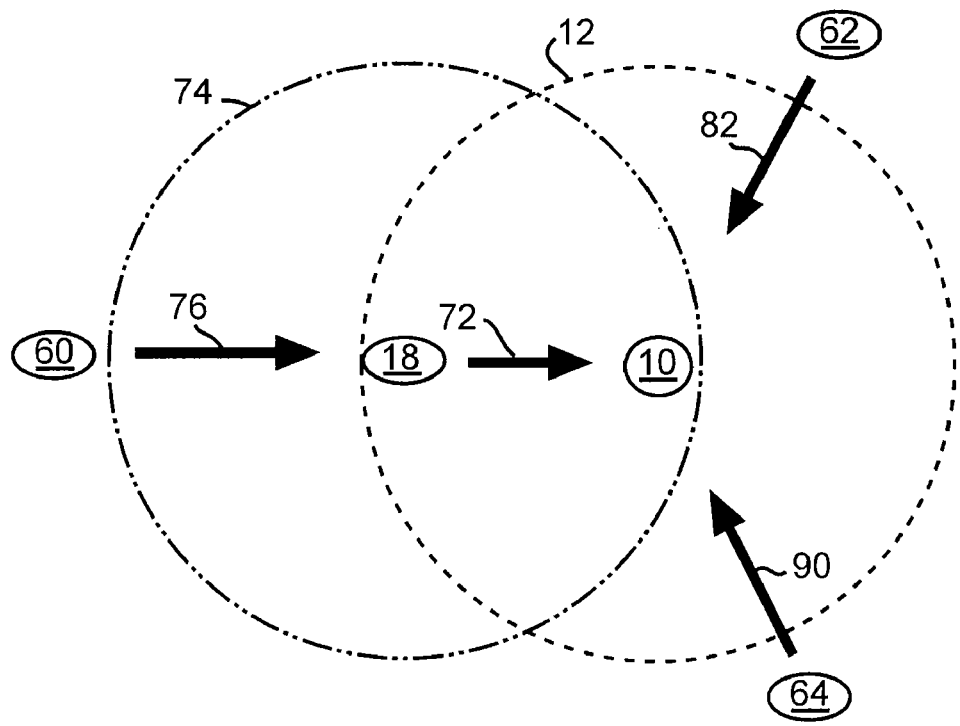
Figure 15:
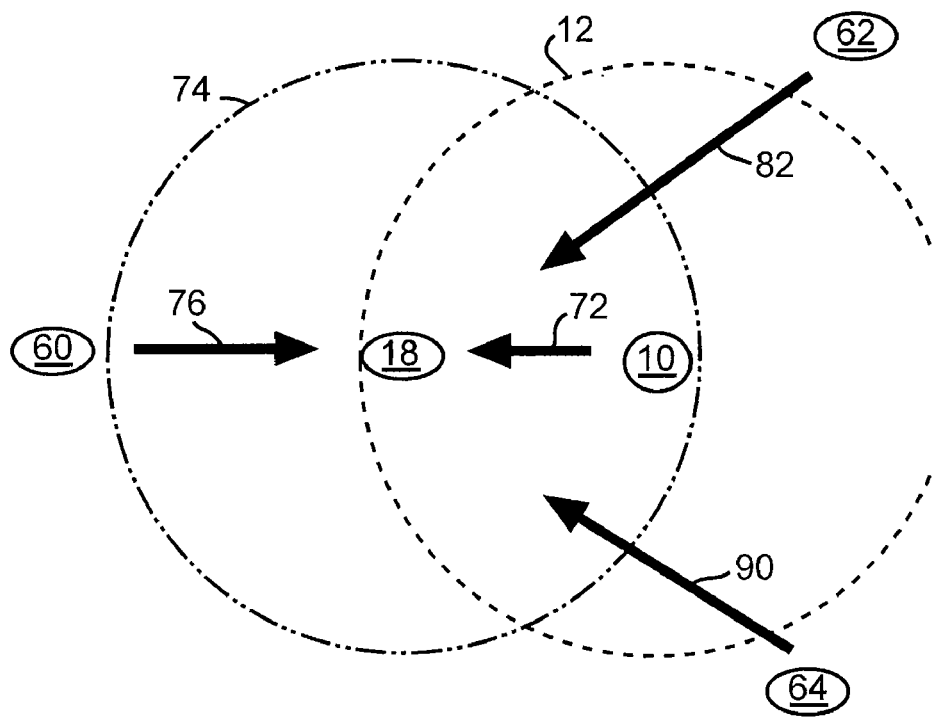

FIG. 14 is a diagram of a wireless cell having an omni-directional antenna, a client having an omni-directional antenna, three noise sources, and a primary direction of data flow from client to wireless cell in accordance with one embodiment of the present invention; and, FIG. 15 is a diagram of a wireless cell having an omni-directional antenna, a client having an omni-directional antenna, three noise sources, and a primary direction of data flow from wireless cell to client in accordance with one embodiment of the present invention.

DETAILED DESCRIPTION OF EXEMPLARY EMBODIMENTS

The detailed description of exemplary embodiments of the invention herein makes reference to the accompanying drawings, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional aspects may not be described in detail herein. Furthermore, the component positions shown in the various figures contained herein are intended to represent exemplary functional relationships and/or physical couplings between the various elements. It should be noted that many alternative or additional functional relationships or physical connections may be present in a practical system. As will be appreciated by one of ordinary skill in the art, the present invention may be embodied as a customization of an existing system, an add-on product, a stand alone system, and/or a distributed system. Accordingly, the present invention may take the form of an entirely hardware embodiment, or an embodiment combining aspects of both software and hardware.

Generally, the invention comprises wireless cells, wireless clients, and methods for improving data throughput. Regarding data throughput, as used herein, the term "throughput" includes the number of bits transmitted and/or received per second. Throughput may generally be categorized into two classes, namely total throughput and usable data throughput. Total throughput includes all bits transmitted and/or received per time period between two devices. Total throughput includes, for example, overhead required by the communication protocol, retransmitted data, and data. As used herein, the term "usable data throughput" includes the actual data transmitted and/or received per time period. Usable data throughput excludes, for example, bits dedicated to overhead, error corrections bits, and retransmitted data. Usable data throughput is also referred to herein as "data throughput." Data throughput may also be described in terms of, for example, minimum, maximum, and average data throughput. As used herein, the term "average data throughput" includes the number of data bits transmitted and/or received divided by the period of time of transmission and/or reception. As used herein, the term "maximum data throughput" includes the maximum number of data bits per time period measured during transmission and/or reception. As used herein, the term "minimum data throughput" includes the minimum number of data bits per time period measured during transmission and/or reception.

Data throughput may be expressed as the number of bits per second. Data throughput may be influenced by factors such as, for example, the presence of noise, receive error, multipath signals, and other factors that may cause communicating devices to decrease their rate of transmission, and to retransmit data. Data throughput may be increased, for example, by decreasing the influence of noise on reception, decreasing the need to retransmit, increasing the transmission and/or reception rates, increasing available transmission and/or reception bandwidth, channel assignments, directional antennas, bandwidth management, bandwidth prioritization, client load balancing, primary direction of data flow, client priority, application priority, attenuating incoming signals, and protocol selection.

Figure 2:
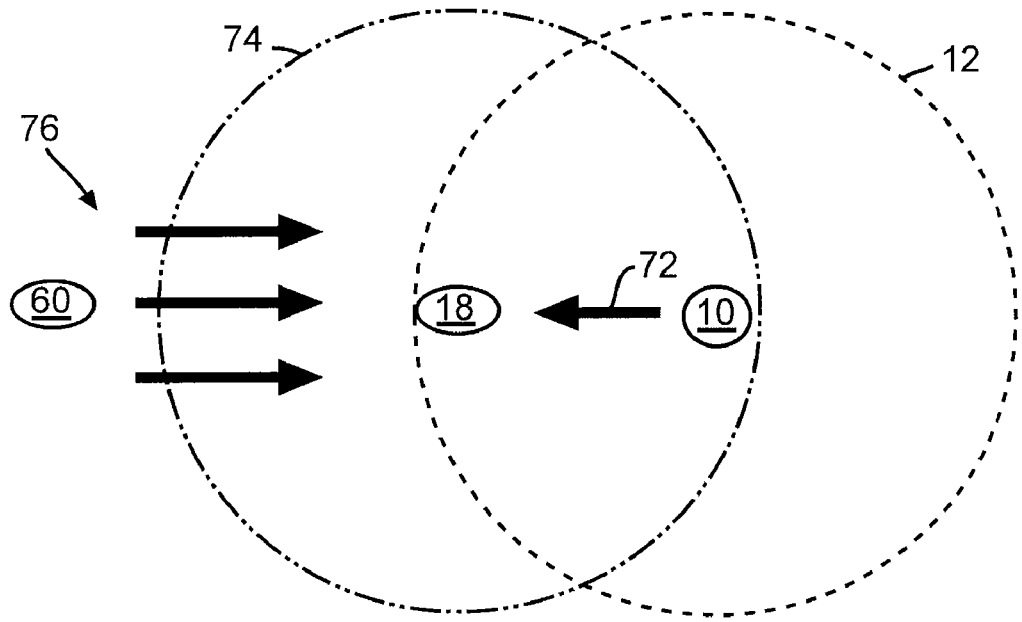
FIG. 2 is a diagram of a wireless cell having an omni-directional antenna, a client having an omni-directional antenna, a noise source, and a primary direction of data flow from wireless cell to client in accordance with one embodiment of the present invention.

Regarding using the direction of data flow as a method to improve throughput, as used herein, the term "primary direction of data flow" includes the direction of transmission of a majority of data between two devices. For example, referring to FIG. 2, suppose that client 18 is running a video application and receives the video data from wireless cell 10. The majority of the data that flows between wireless cell 10 and client 18 flows from wireless cell 10 to client 18. Thus, the primary direction of data flow is from wireless cell 10 to client 18. Client 18 may transmit retransmission requests or status information, but in a typical video application, client 18 receives more data from wireless cell 10 than it transmits to wireless cell 10.

In particular, in one embodiment of the invention, a wireless cell and/or client detects noise sources, detects the channels used by the noise sources, determines the primary direction of data flow, and selects a channel for communication between the wireless cell and client that reduces noise source interference with the primary direction of data flow. In an exemplary embodiment, the selected channel minimizes noise source interference with the primary direction of data flow even though interference with the non-primary direction of data flow may not be minimized.

Some of the examples and embodiments associated with the primary direction of data flow include omni-directional antennas, directional antennas, specific directional antenna orientations, distances between noise sources and receiving devices, directions of primary data flow, signal strengths, and channel assignments. The examples and embodiments are given by way of explanation and not by way of limitation. Antennas of any type or having any desirable characteristics may be used. Some exemplary characteristics include gain, angle of coverage, number of active elements, and level of attenuation of signals from behind the antenna. The antennas may be oriented in any manner. Physical sectors may overlap or be non-overlapping. Any number of antennas may be used with either wireless cells or clients. The antennas of any wireless device may be used simultaneously or individually. The criteria for selecting which antenna or antennas are used may utilize any metric such as, for example, signal-to-noise ratio, noise source signal strength, data throughput, error rate, transmission activity level, and retransmission rate. Each wireless cell and/or client may have any number of radios and/or other electronic elements to utilize the antennas.

The primary direction of data flow may be from any wireless device to any other wireless device, for example, wireless cell to client, client to wireless cell, wireless cell to wireless cell, client to client, client to multiple wireless cells, and wireless cell to multiple clients. The primary direction of data flow may be substantially static or change dynamically. The channel used for communication may change independently or coincidental to a change in an operational factor such as, for example, a change in the primary direction of data flow, change of channel usage by noise sources, change of position of a noise source, and movement of a client. The transmit signal strengths of the various wireless devices and/or noise sources may be uniform or vary. Any channel may be assigned to any wireless device and/or antenna. For example, wireless cells and clients may be assigned the same channel as a noise source, different minimally interfering channels may be assigned to the different antennas of a single wireless device, channels may be assigned to be different from a noise source, and channel assignments may be static or changed dynamically.

Figure 1:
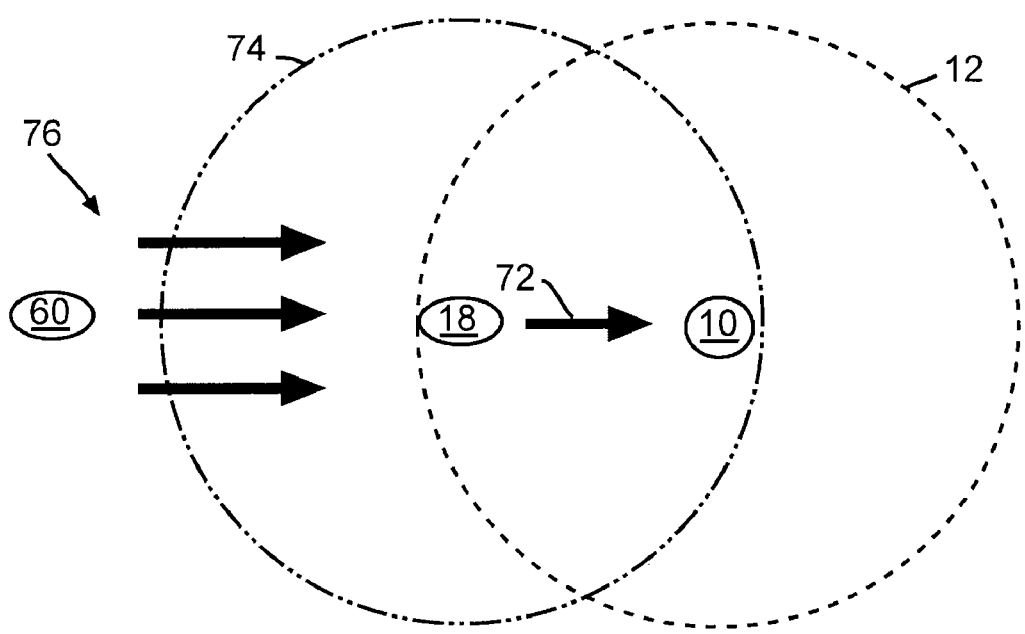
FIG. 1 is a diagram of a wireless cell having an omni-directional antenna, a client having an omni-directional antenna, a noise source, and a primary direction of data flow from client to wireless cell in accordance with one embodiment of the present invention.

Data throughput may be improved by detecting and using the primary direction of data flow. In one embodiment, referring to FIG. 1, wireless cell 10 and client 18 have omni-directional antennas that form physical sectors 12 and 74, respectively. In one embodiment, the majority of the communications between client 18 and wireless cell 10 comprises transmissions from client 18 to wireless cell 10. In such operating circumstances, the primary direction of data flow is from client 18 to wireless cell 10 (as depicted by arrow 72). In another embodiment, noise source 60 transmits information on the same channel as client 18 and wireless cell 10, for example, on channel C1. Any type of a device may operate as a noise source, for example, a wireless cell, a client, a cell phone, and/or any wireless device that transmits in the frequency band of interest. Transmissions from noise source 60 (represented by arrows 76) may reach both client 18 and wireless cell 10, thus transmissions from noise source 60 may interfere with transmissions from client 18 as received by wireless cell 10. When the primary direction of data flow is reversed (referring to arrow 72 in FIG. 2), transmissions from noise source 60 may still reach both client 18 and wireless cell 10, thus transmissions from noise source 60 may interfere with transmissions from wireless cell 10 as received by client 18.

Figure 3:
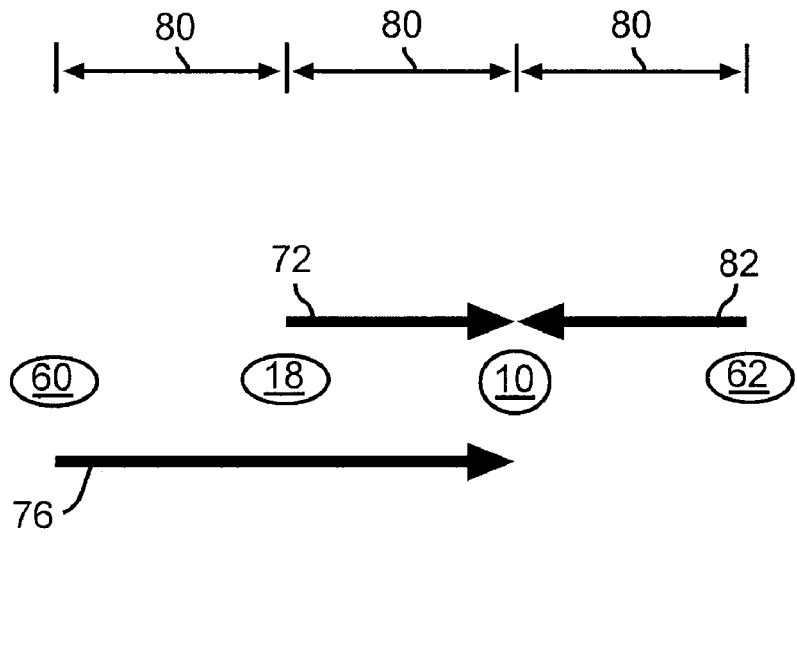
FIG. 3 is a diagram of a wireless cell having an omni-directional antenna, a client having an omni-directional antenna, and two noise sources in accordance with one embodiment of the present invention.

Environmental conditions and the distance from the noise source to the receiving device, combined with the primary direction of data flow may improve data throughput even when both the client 18 and the wireless cell 10 use omni-directional antennas. For example, referring to FIG. 3, wireless cell 10 and client 18 are positioned in a room surrounded by wall 78. Noise source 60 is positioned outside of the room, while noise source 62 is inside the room. For this embodiment, both noise source 60 and 62 transmit on the same channel as wireless cell 10 and client 18. In an exemplary embodiment, client 18 and noise source 62 are positioned a distance 80, as shown in FIG. 3, from wireless cell 10, and noise source 60 is positioned a distance 80 from client 18. When the primary direction of data flow is from client 18 to wireless cell 10 (as indicated by arrow 72), signals from client 18 and noise source 62 travel a distance 80 before reaching wireless cell 10; whereas, signals from noise source 60 travel a distance of twice distance 80 before reaching wireless cell 10.

In an embodiment, client 18 and noise sources 60 and 62 transmit at the same power levels and with approximately the same level of transmission activity. Estimating the signal-to-noise ratio ("SNR") for the signal from client 18 to the noise of noise source 60 and noise source 62 separately provides insight in to how the primary direction of data flow may be used to improve data throughput. The equations below are simplified estimates of the SNR for each noise source acting independently. Calculating the SNR with respect to multiple noise sources operating simultaneously on the same channel requires complex equations. The equations of this application simplify the calculation by analyzing the SNR of a desired signal against the signal of a single noise source as though the other noise sources provide no additional interference.

In an exemplary embodiment, referring to FIG. 3, where the primary direction of data flow is from client 18 to wireless cell 10, the SNR of the signal from client 18 to the noise of noise source 62 may be estimated by noticing that signals transmitted from client 18 and noise source 62 travel a distance of distance 80 before reaching wireless cell 10. For the distances traveled, the SNR of the signal from client 18 to the noise from noise source 62 as received by wireless cell 10 may be estimated as:

$$SNR(@wirelesscell10) \approx 10\log\left(\frac{\text{Distance80}^2}{\text{Distance80}^2}\right) \approx 10\log(1) \approx 0 \text{ dB}$$

A resulting SNR of 0 dB means that wireless cell 10 may perceive signals from client 18 and noise from noise source 62, equally. In estimating the SNR of the signal from client 18 to the noise of noise source 60, signals from noise source 60 travel a distance of two times distance 80 before reaching wireless cell 10. For the distances traveled by signals between client 18, noise source 60, and wireless cell 10, the SNR of the signal from client 18 to the noise from noise source 60 as received by wireless cell 10 may be estimated as:

$$SNR(@wirelesscell10) \approx 10\log\left(\frac{(2*D80)^2}{D80^2}\right) \approx 10\log(4) \approx 6 \text{ dB}$$

The term "D80" is shorthand for the distance 80. A resulting SNR of 6 dB means that wireless cell 10 may more readily perceive signals from client 18 than noise from noise source 60. Absent any other factors, noise source 60 interferes with transmissions from client 18 less than noise source 62 when the primary direction of data flow is from client 18 to wireless cell 10. Environmental factors (such as wall 78) may also play a role in the interference due to a noise source for a given primary direction of data flow. Signals transmitted through a plaster wall may lose about 5 dB of signal strength. Noise transmitted by noise source 60 passes through wall 78 before reaching wireless cell 10. The decrease in the signal strength of the signals from noise source 60 results in a SNR of the signal from client 18 to the noise from noise source 60 as perceived and/or received by wireless cell 10 of approximately 11 dB. Because noise source 62 is in the room with wireless cell 10, its signals do not pass through wall 78 before reaching wireless cell 10, thus the SNR of the signals of client 18 to the noise of noise source 62 is not improved by the presence of wall 78.

When the primary direction of data flow is from client 18 to wireless cell 10, wall 78 may improve data throughput by weakening the interference caused by noise source 60. When the primary direction of data flow is from wireless cell 10 to client 18, wall 78 still provides a benefit, but the amount of the benefit is decreased because the receiving device, client 18, is closer to noise source 60 than when the primary direction of data flow was from client 18 to wireless cell 10.

Based on the estimates of the above equations, for the embodiment shown in FIG. 3, wireless cell 10 and/or client 18 may take any action to improve data throughput. For example, switching wireless cell 10, client 18 and noise source 60 to a channel different from the channel used by noise source 62 may improve data throughput because the strongest source of interference, noise source 62, would be reduced. In another embodiment, wireless cell 10 and client 18 are switched to a channel that is different from the channels used by both noise sources 60 and 62. Another embodiment depends on the level of transmission activity of noise source 62. In a situation where noise source 62 transmits intermittently and significantly less than noise source 60, data throughput may be improved by switching wireless cell 10, client 18, and noise source 62 to the same channel, while noise source 60 uses a different channel. While interference from noise source 62 may be stronger than interference from noise source 60 for the primary direction of data flow, interference from noise source 62 occurs less frequently than interference from noise source 60. The action taken to improve data throughput may also be affected by the transmit strength of each noise source. The SNR estimation equations presume that each noise source transmits with equal strength; however, equal signal strength is not a requirement. Wireless cell 10 and client 18 may use a channel, taking into account the primary direction of data flow, that carries a weaker interference signal strength.

In a variation of the embodiment of FIG. 3, the primary direction of data flow is from wireless cell 10 to client 18 (not shown in FIG. 3) and the SNR of the signals from wireless cell 10 to the noise from noise sources 60 as received by client 18, neglecting any loss through wall 78, may be estimated as:

$$SNR(@client18) \approx 10\log\left(\frac{D80^2}{D80^2}\right) \approx 10\log(1) \approx 0 \text{ dB}$$

Accounting for the loss through wall 78 may improve the SNR with respect to noise source 60. The SNR of the wireless cell 10 signals to the noise of noise source 62 only as perceived by client 18 may be estimated as:

$$SNR(@client18) \approx 10\log\left(\frac{(2*D80)^2}{D80^2}\right) \approx 10\log(4) \approx 6 \text{ dB}$$

Based on the estimates of the above two equations, changing the primary direction of data flow changed the amount of possible interference from the noise sources. Wireless cell 10 and/or client 18 may improve data throughput by taking similar actions to those taken above. For example, switching wireless cell 10, client 18 and noise source 62 to a channel different from the channel used by noise source 60. Additionally, switching wireless cell 10, client 18, and noise source 62 to a channel different from noise source 60 when noise source 60 transmits intermittently.

Data throughput may be improved by equipping clients with at least one directional antenna and positioning the antenna physical sectors according to the primary direction of data flow. In an exemplary embodiment, referring to FIG. 4, client 18 has one directional antenna that forms physical sector 74. Wireless cell 10 has an omni-directional antenna that forms physical sector 12. In this embodiment, client 18 is positioned to point its directional antenna towards wireless cell 10 and away from noise source 60. In an embodiment, noise source 60 transmits information on the same channel as client 18 and wireless cell 10, for example, transmits on channel C1. Assume also that the primary direction of data flow is from client 18 to wireless cell 10 (as indicated by arrow 72). Even though client 18 has a directional antenna because wireless cell 10 has an omni-directional antenna and the primary direction of data flow is into wireless cell 10, transmissions from noise source 60 may interfere, to some degree, with transmissions from client 18.

Figure 4:
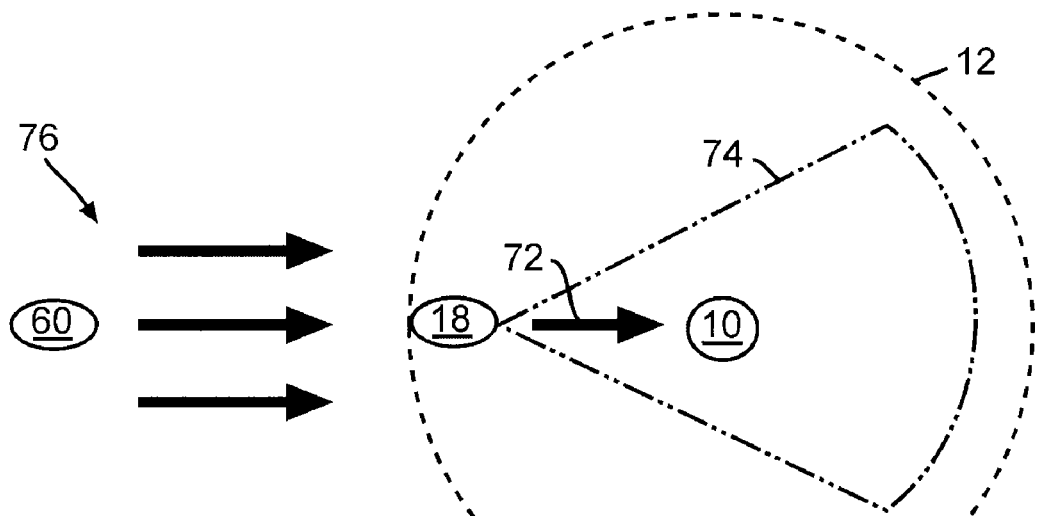
FIG. 4 is a diagram of a wireless cell having an omni-directional antenna, a client having a directional antenna, a noise source, and a primary direction of data flow from client to wireless cell in accordance with one embodiment of the present invention.
Figure 5:
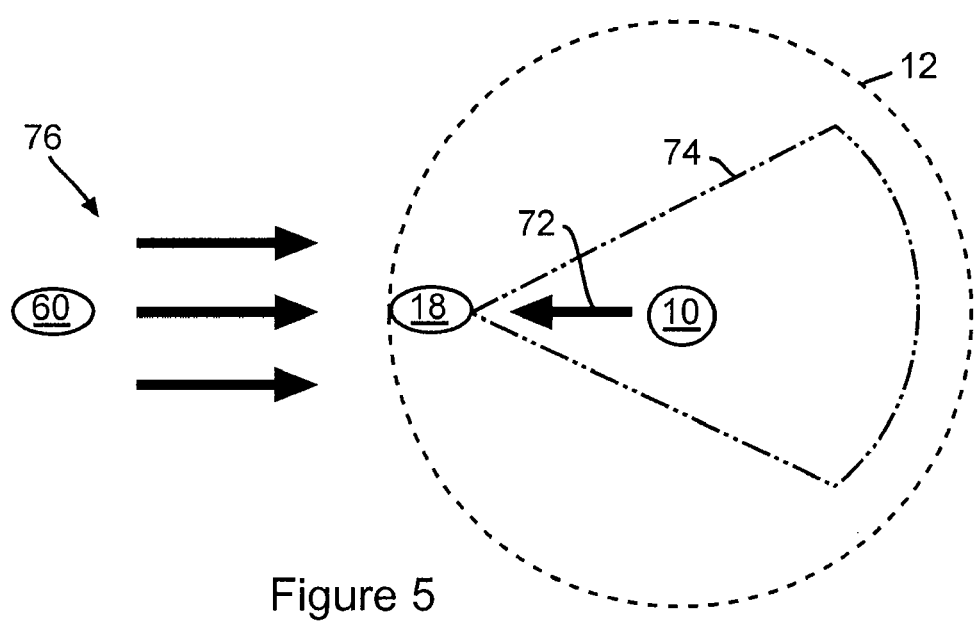
FIG. 5 is a diagram of a wireless cell having an omni-directional antenna, a client having a directional antenna, a noise source, and a primary direction of data flow from wireless cell to client in accordance with one embodiment of the present invention.

Reversing the primary direction of data flow (referring to arrow 72 in FIG. 5) may improve data throughput because of the positioning of the directional antenna. Noise source 60 transmits towards client 18 from behind the directional antenna. Directional antennas attenuate signals transmitted from a direction other than the direction in which the antenna is oriented. In this embodiment, the directional antenna of client 18 receives transmissions from wireless cell 10 (as depicted by arrow 72); whereas, signals from noise source 60 (depicted as arrows 76) are attenuated. Thus, client 18 perceives signals from the direction of wireless cell 10 as being stronger than the signals from the direction of noise source 60. Data throughput may improve, in this embodiment, referring to FIG. 5, when the primary direction of data flow is from wireless cell 10 to client 18 because the signal-to-noise ratio of the signal (arrow 72) to the noise (arrows 76) is higher as received by client 18 than when the primary direction of data flow is from the client 18 to the wireless cell 10 (as shown in FIG. 4). The orientation of the directional antenna of client 18, as shown in FIG. 5, combined with the primary direction of data flow from the wireless cell 10 to client 18 (referring to line 72) may provide an improvement in data throughput even when noise source 60, client 18, and wireless cell 10 all use the same channel.

In another embodiment, client 18 has multiple directional antennas with physical sectors that may overlap. For example, referring to FIG. 6, client 18 has six directional antennas forming physical sectors 74, 78, 80, 82, 84, and 86 that overlap to form virtual sectors. Each antenna is oriented in a different direction. Multiple directional antennas enable client 18 to use the antenna and/or antennas that provide the best data throughput for a given primary direction of data flow. The antenna or antennas used by client 18 may be selected in any manner using any criteria such as, for example, signal-to-noise ratio, data throughput, error rate, and signal strength. In the embodiment shown in FIG. 6, the antenna that forms physical sector 74 may deliver higher data throughput than the other antennas because it is oriented more directly towards wireless cell 10 and more opposed to noise source 60.

Figure 7:
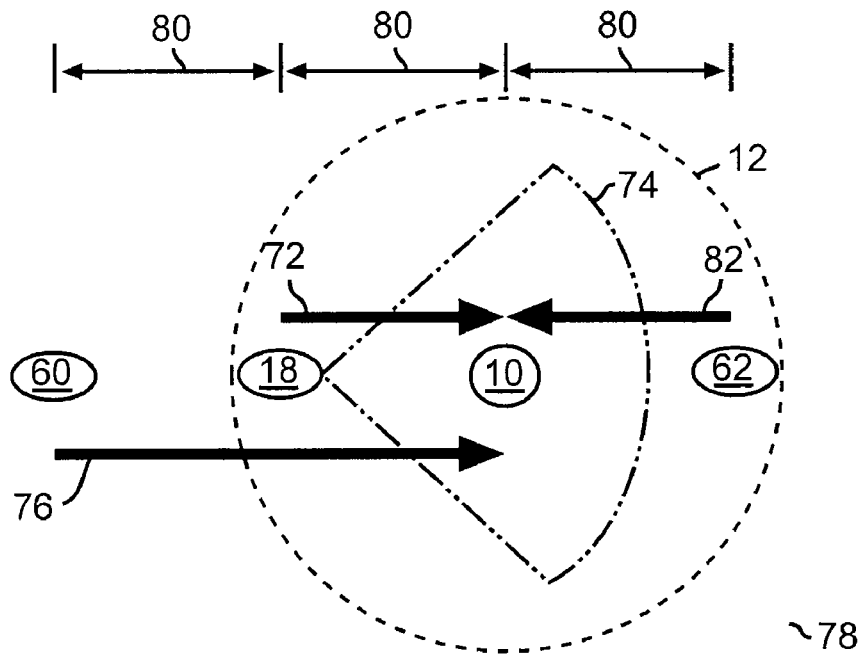
FIG. 7 is a diagram of a wireless cell having an omni-directional antenna, a client having a directional antenna, two noise sources, and a primary direction of data flow from client to wireless cell in accordance with one embodiment of the present invention.

In an embodiment that utilizes directional antennas, referring to FIG. 7, client 18 uses a single directional antenna that forms physical sector 74 which is oriented in the direction of wireless cell 10 and noise source 62. Noise source 60 is positioned outside of the room formed by wall 78, while noise source 62 is inside the room. As performed above, the SNR for each noise sources with respect to the primary direction of data flow may be estimated. In the case of the SNR of the signal from client 18 to the noise of noise source 62, signals transmitted from client 18 and noise source 62 travel a distance of distance 80 before reaching wireless cell 10. For the distances traveled by signals, the SNR of the signal from client 18 to the noise from noise source 62 as received by wireless cell 10 may be estimated as:

$$SNR(@wirelesscell10) \approx 10\log\left(\frac{D80^2}{D80^2}\right) \approx 10\log(1) \approx 0 \text{ dB}$$

In the case of the SNR of the signal from client 18 to the noise of noise source 60, signals transmitted from client 18 travel a distance of distance 80 before reaching wireless cell 10, while the signals from noise source 60 travel a distance of two times distance 80 before reaching wireless cell 10. For the distances traveled, the SNR of the signal from client 18 to the noise from noise source 60, only as received by wireless cell 10, may be estimated as:

$$SNR(@wirelesscell10) \approx 10\log\left(\frac{(2*D80)^2}{D80^2}\right) \approx 10\log(4) \approx 6\,dB$$

Wall 78 may also improve the SNR of noise source 60, but not the SNR of noise source 60. For the resulting SNR values, data throughput may be improved by taking action to first reduce the interference from noise source 62. Next, data throughput may be additionally improved by reducing the interference from noise source 60. Such actions may include, for example, switching wireless cell 10, client 18, and noise source 60 to a channel that is different from noise source 62; switching wireless cell 10 and client 18 to a channel that is different from both noise sources 60 and 62; and switching wireless cell 10 and client 18 to a channel used by the noise source whose level of transmission activity is lowest.

Figure 8:
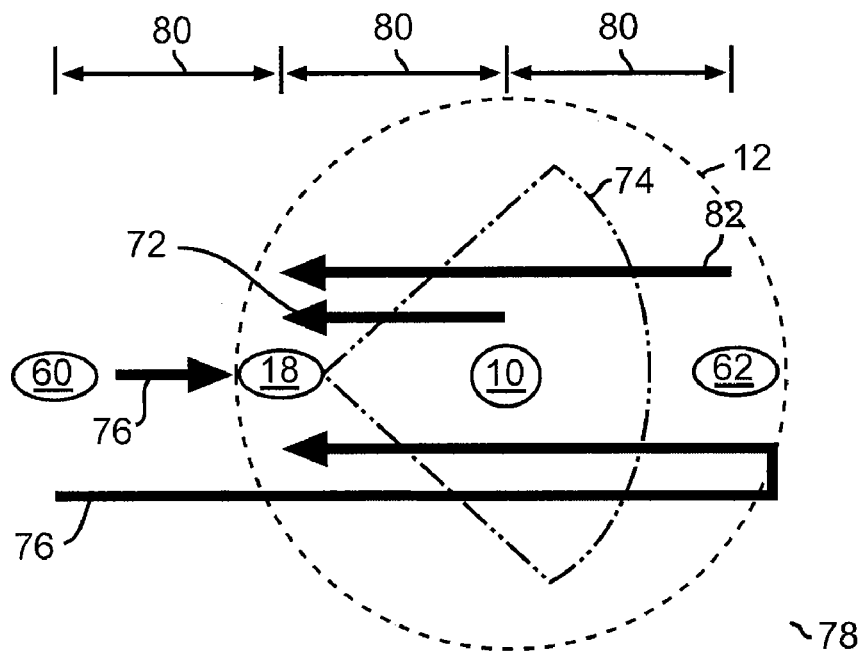
FIG. 8 is a diagram of a wireless cell having an omni-directional antenna, a client having a directional antenna, two noise sources, and a primary direction of data flow from wireless cell to client in accordance with one embodiment of the present invention.

Reversing the primary direction of flow of data may change the method of achieving improved data throughput. In an exemplary embodiment, referring to FIG. 8, the primary direction of data flow (arrow 72) is from wireless cell 10 to client 18. Noise source 62 transmits signals (arrow 82) which are received by client 18 because the directional antenna used by client 18 is oriented in the direction of noise source 62. Noise source 60 transmits signals (arrows 76) in the direction of client 18, but they are attenuated by the directional antenna. Wall 78 may both attenuate and reflect signals, for example, transmitted signal 76 may pass through wall 78, travel across the room, reflect off the inner surface of wall 78 and travel towards client 18 in the direction where client 18 may receive signal 76. As performed above, the SNR may be estimated for each noise source. In the case of the SNR of the signal from wireless cell 10 to the noise of noise source 62, signals transmitted from wireless cell 10 travel a distance of distance 80 and signals from noise source 62 travel a distance of twice distance 80 before reaching client 18. For the distances traveled by the signals, the SNR of the signal from wireless cell 10 to the noise from noise source 62 only as received by client 18 may be estimated as:

$$SNR(@client18) \approx 10\log\left(\frac{(2*D80)^2}{D80^2}\right) \approx 10\log(4) \approx 6\,dB$$

In the case of the SNR of the signal from wireless cell 10 to the noise of noise source 60, signals transmitted from wireless cell 10 travel a distance of distance 80 before reaching client 18. Ignoring signals from noise source 60 that are attenuated behind the directional antenna of client 18, signals from noise source 60 travel a distance of five times distance 80 before reaching client 18. For the distances traveled, the SNR of the signal from wireless cell 10 to the noise from noise source 60 only as received by client 18 may be estimated as:

$$SNR(@client18) \approx 10\log\left(\frac{(5*D80)^2}{D80^2}\right) \approx 10\log(25) \approx 14\,dB$$

The SNR ratio of wireless cell 10 to noise source 60 may improve by accounting for wall 78. For the embodiment of FIG. 8, the directional antenna combined with the primary direction of data flow from wireless cell 10 to client 18 improved SNR over the embodiment of FIG. 7 without further action. However, SNR may improve even further by taking action to reduce the interference first from noise source 62, then from noise source 60, as previously described.

The analysis of the effects of the primary direction of data flow on an embodiment where wireless cell 10 is equipped with at least one directional antenna and client 18 with an omni-directional antenna is similar to the analysis where wireless cell 10 has an omni-directional antenna and client 18 at least one directional antenna, as analyzed above. In general, orienting a directional antenna away from a noise source and towards the primary direction of data flow tends to improve SNR and data throughput. Assigning a channel to wireless cell 10 and client 18 that is different from the channel used by the nearest noise source, while taking into account the primary direction of data flow, may further improve data throughput.

Figure 9:
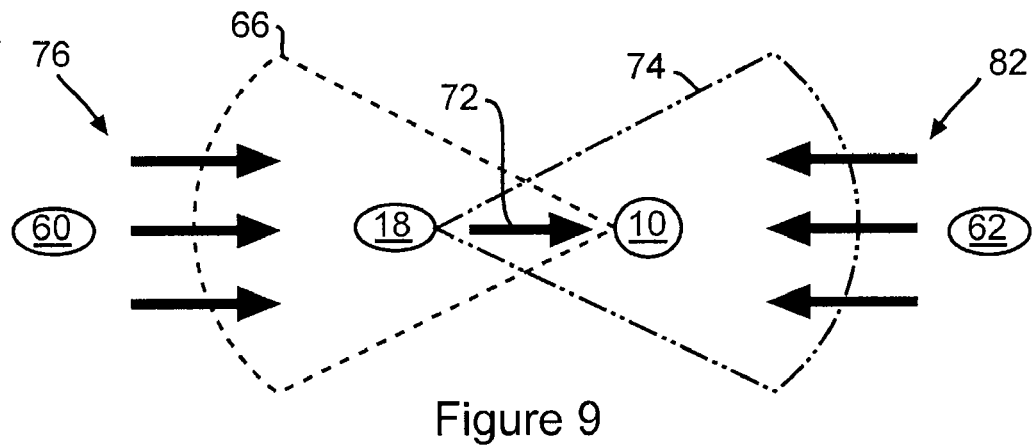
FIG. 9 is a diagram of a wireless cell having a directional antenna, a client having a directional antenna, two noise sources, and a primary direction of data flow from client to wireless cell in accordance with one embodiment of the present invention.

Equipping both client 18 and wireless cell 10 with at least one directional antenna may improve data throughput for various directions of primary data flow. In one embodiment, referring to FIG. 9, wireless cell 10 has one directional antenna that forms physical sector 66. The directional antenna of wireless cell 10 is oriented towards client 18 and away from noise source 62. Client 18 has one directional antenna that forms physical sector 74 that is oriented towards wireless cell 10 and away from noise source 60. Arrow 72 indicates the primary direction of data flow and transmissions from noise sources 60 and 62 are represented by arrows 76 and 82, respectively. Transmissions from noise source 60 enter the directional antenna of wireless cell 10 and interfere to some degree with transmissions from client 18 to wireless cell 10. Transmissions from noise source 62 approach the directional antenna of wireless cell 10 from behind and are attenuated. Switching client 18 and wireless cell 10 to work on a channel that is different from the channel used by noise source 60 may reduce interference of transmissions from noise source 60 with wireless cell 10 reception of data from client 18, thereby increasing throughput.

Figure 6:
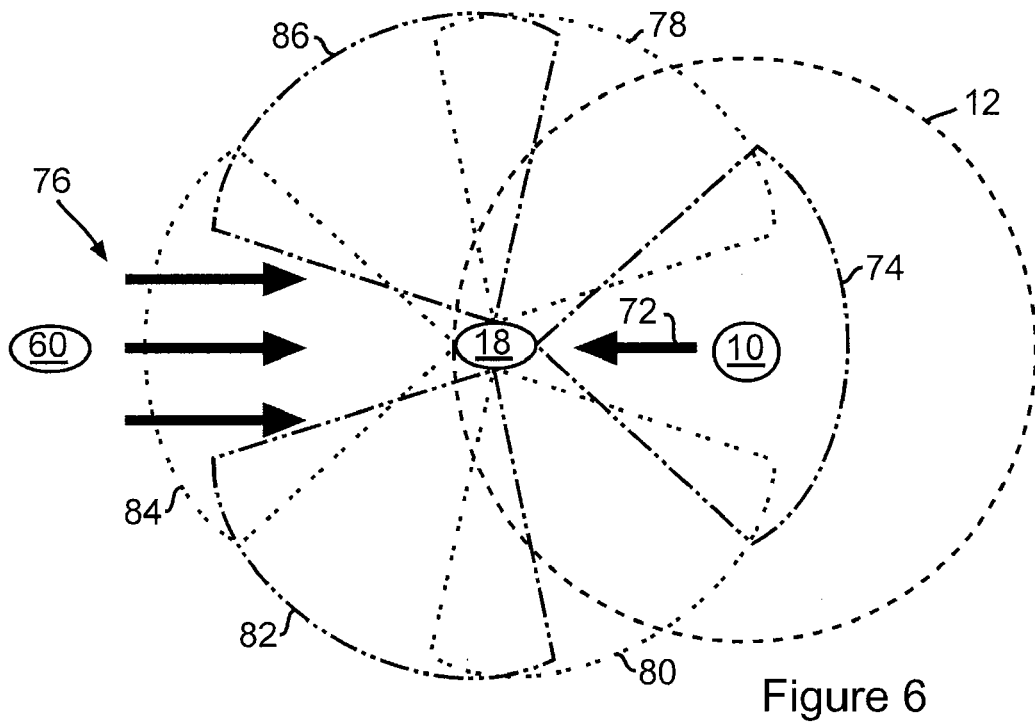
FIG. 6 is a diagram of a wireless cell having an omni-directional antenna, a client having a plurality of directional antennas, a noise source, and a primary direction of data flow from wireless cell to client in accordance with one embodiment of the present invention.
Figure 10:
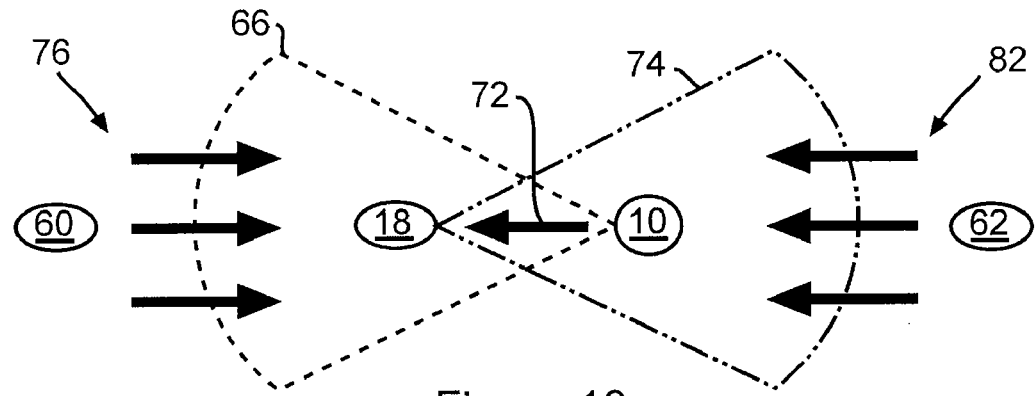
FIG. 10 is a diagram of a wireless cell having a directional antenna, a client having a directional antenna, two noise sources, and a primary direction of data flow from wireless cell to client in accordance with one embodiment of the present invention.
Figure 11:
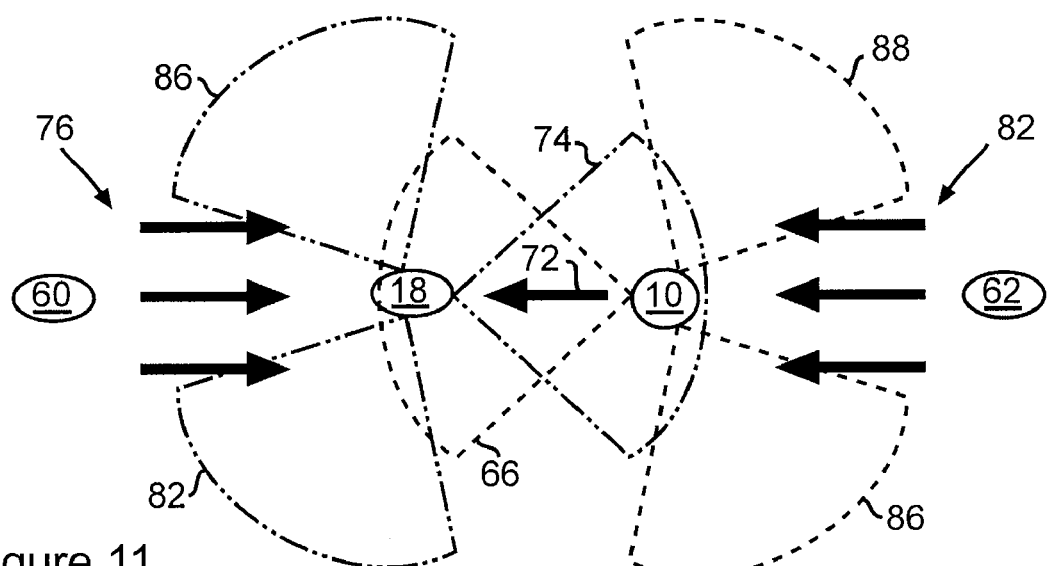
FIG. 11 is a diagram of a wireless cell having a plurality of directional antennas, a client having a plurality of directional antennas, two noise sources, and a primary direction of data flow from wireless cell to client in accordance with one embodiment of the present invention.

Reversing the direction of primary data flow, referring to FIG. 10, simply changes which noise source may interfere with reception at client 18. Transmissions from noise source 62 may interfere with the reception of data by client 18 from wireless cell 10. Transmissions from noise source 60 approach the directional antenna of client 18 from behind and are attenuated. Changing the channel used by wireless cell 10 and client 18 to be different from the channel used by noise source 62 may reduce interference from noise source 62 with client 18 reception of data from wireless cell 10, thereby increasing data throughput. Wireless cell 10 and/or client 18 may have multiple directional antennas, as shown in the embodiments of FIGS. 6 and 11. Wireless cell 10 and/or client 18 may use any method to select an antenna and/or antennas for communication.

Figure 12:
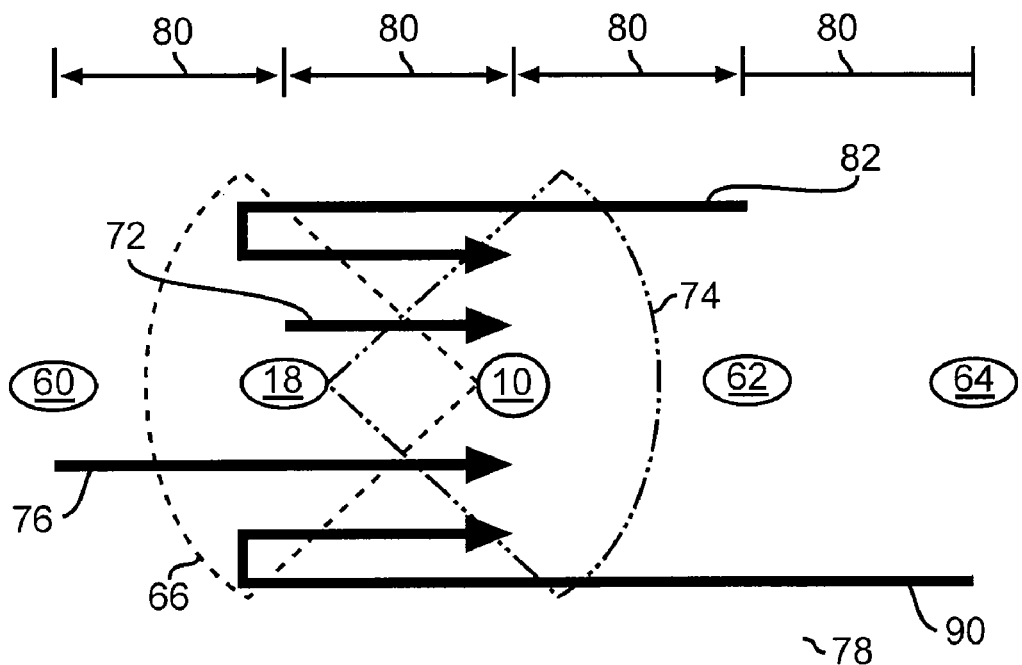
FIG. 12 is a diagram of a wireless cell having a directional antenna, a client having a directional antenna, three noise sources, and a primary direction of data flow from client to wireless cell in accordance with one embodiment of the present invention.

Environmental conditions and the distance of the noise source from the receiving device combined with the primary direction of data flow may improve data throughput when wireless cell 10 and client 18 use directional antennas. In one embodiment, referring to FIG. 12, wireless cell 10 and client 18 are positioned in a room formed by wall 78. Client 18 uses a single directional antenna that forms physical sector 74 which is oriented in the direction of wireless cell 10, noise source 62, and noise source 64. Wireless cell 10 uses a single directional antenna that forms physical sector 66 which is oriented in the direction of client 18 and noise source 60. Noise sources 60 and 64 are positioned outside of the room while noise source 62 is inside the room. Client 18 and noise source 62 are positioned a distance 80 from wireless cell 10, noise source 60 is positioned a distance 80 from client 18, and noise source 64 a distance 80 from noise source 62. The primary direction of data flow (indicated by arrow 72) is from client 18 to wireless cell 10. Signals from client 18 travel a distance 80 before being received by the directional antenna of wireless cell 10. Signals from noise source 62, 60, and 64 travel three, two, and four times distance 80 (lines 82, 76, and 90), respectively, before being received by the directional antenna of wireless cell 10. In the case of the SNR of the signal from client 18 to the noise of noise source 60, signals transmitted from client 18 travel a distance of distance 80 before reaching wireless cell 10. However, signals from noise source 60 travel a distance of two times distance 80 (referring to line 76) before reaching wireless cell 10. For the distances traveled, the SNR of the signal from client 18 to the noise from noise source 60, as received by wireless cell 10, may be estimated as:

$$SNR(@wirelesscell10) \approx 10\log\left(\frac{(2*D80)^2}{D80^2}\right) \approx 10\log(4) \approx 6 \text{ dB}$$

The SNR ratio of client 18 to noise source 60 may improve by accounting for attenuation through wall 78. In the case of the SNR of the signal from client 18 to the noise of noise source 62, signals transmitted from noise source 62 (referring to line 82), cross the room, reflect from the inner portion of wall 78 and enter the directional antenna of wireless cell 10. Signals from noise source 62 travel a distance of three times distance 80 before reaching wireless cell 10. In an embodiment, the reflection from the inner surface of wall 78 is lossless or substantially lossless. For the distances traveled, the SNR of the signal from client 18 to the noise from noise source 62 as received by wireless cell 10 may be estimated as:

$$SNR(@wirelesscell10) \approx 10\log\left(\frac{(3*D80)^2}{D80^2}\right) \approx 10\log(9) \approx 9.5 \text{ dB}$$

The SNR ratio of client 18 to noise source 62 does not pass through wall 78 and does not benefit from the attenuation of the noise source as it passes through the wall. In the case of the SNR of the signal from client 18 to the noise of noise source 64, signals transmitted from noise source 64 (referring to line 90) travel a distance of four times distance 80 before reaching wireless cell 10. For the distances, the SNR of the signal from client 18 to the noise from noise source 64, as received by wireless cell 10, may be estimated as:

$$SNR(@wirelesscell10) \approx 10\log\left(\frac{(4*D80)^2}{D80^2}\right) \approx 10\log(16) \approx 12dB$$

The SNR ratio of client 18 to noise source 64 may improve by accounting for attenuation through wall 78. Based on the estimates of the above three equations, for the embodiment shown in FIG. 12, wireless cell 10 and/or client 18 may improve data throughput by taking any action that may reduce interference first from noise source 60, next from noise source 62, and then by noise source 64. For example, wireless cell 10 and client 18 may reduce interference from the two nearest noise sources, accounting for the primary direction of data flow, by switching to a channel that is from the channels used by noise sources 60 and 62, even though it may be the same channel used by noise source 64.

Reversing the primary direction of flow of data may change the method of achieving improved data throughput. In another embodiment, referring to FIG. 13, the primary directional of data flow (arrow 72) is from wireless cell 10 to client 18. Following the methods of analysis presented above, only the equations that estimate the SNR are given. The SNR of the signal from wireless 10 to the noise of noise source 62 as received by client 18 may be estimated as:

$$SNR(@client18) \approx 10\log\left(\frac{(2*D80)^2}{D80^2}\right) \approx 10\log(4) \approx 6dB$$

The SNR of the signal from wireless 10 to the noise of noise source 64 as received by client 18 may be estimated as:

$$SNR(@client18) \approx 10\log\left(\frac{(3*D80)^2}{D80^2}\right) \approx 10\log(9) \approx 9.5dB$$

The SNR of the signal from wireless 10 to the noise of noise source 60 as received by client 18 may be estimated as:

$$SNR(@client18) \approx 10\log\left(\frac{(5*D80)^2}{D80^2}\right) \approx 10\log(25) \approx 14dB$$

Figure 13:
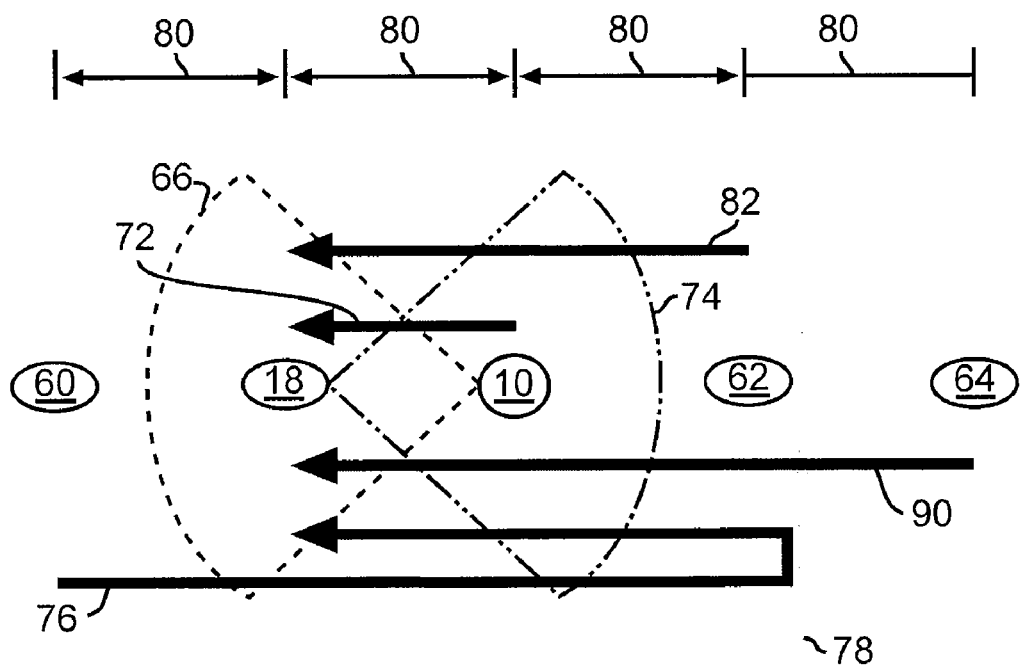
FIG. 13 is a diagram of a wireless cell having a directional antenna, a client having a directional antenna, three noise sources, and a primary direction of data flow from wireless cell to client in accordance with one embodiment of the present invention.

Based on the estimates of the above three equations, for the embodiment shown in FIG. 13, wireless cell 10 and/or client 18 may improve data throughput by taking any action that will reduce interference first from noise source 62, next from noise source 64, and followed by noise source 60.

In another embodiment, referring to FIG. 14, wireless cell 10 and client 18 have omni-directional antennas. An exemplary wireless cell 10 is an I.E.E.E. 802.11a/b/g compliant access point. An exemplary client 18 is an I.E.E.E. 802.11a/b/g compliant client, for example, a mobile computer. Exemplary noise sources 60, 62, and 64 each use a different 802.11a/b/g minimally interfering channel, for example, channel 1, channel 6, and channel 11, respectively. Because wireless cell 10 and client 18 have omni-directional antennas, both receive noise signals from each noise source 60-64. Highest throughput may be achieved when wireless cell 10 and client 18 communicate using the channel with the least amount of interference and/or highest SNR for the primary direction of data flow. In this embodiment, the primary direction of data flow is from client 18 to wireless cell 10. Noise source 60 lies farther from wireless cell 10 than noise sources 62 and 64, thus data throughput may be increased when wireless cell 10 and client 18 communicate using the channel 1 as opposed to channels 6 or 11. Changing the direction of data flow changes the channel that may provide the highest data throughput.

Referring the FIG. 15, wireless cell 10 communicates with client 18 with a primary data flow from wireless cell 10 to client 18. Noise sources 60, 62, and 64 are assigned channel 1, channel 6, and channel 11, respectively. Noise sources 62 and 64 are equidistance from client 18 and both are farther away from client 18 than noise source 60, thus for the primary direction of data flow, data throughput may be increased when wireless cell 10 and client 18 use either channel 6 or 11. Using directional antennas for the embodiments of FIGS. 14 and 15 may also improve SNR and data throughput, but may include different channel assignments. Directional antennas may alter which noise source provides the most interference for a given primary direction of data flow. Channel assignments may also be made in systems using directional antennas to reduce the interference from the nearest noise sources with respect to the primary direction of data flow.

Channel assignments and/or primary direction of data flow are not required to be static. When the primary direction of data flow changes, channel assignments may also change to a configuration that provides an improved SNR and/or data throughput for the new primary direction of data flow. Detecting environmental effects and system operation such as, for example, the primary direction of data flow, interference from noise sources, SNR, channels of noise sources, data throughput and signal strengths may be accomplished in any manner.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method, performed by a wireless cell and a client, for improving a data throughput between the wireless cell and the client, the method comprising:
    determining a primary direction of data flow between the wireless cell and the client, wherein the wireless cell wirelessly communicates with the client using a first channel of a plurality of channels and wherein if the primary direction of data flow is from the wireless cell to the client, denominating the wireless cell as a transmitting device and the client as a receiving device, otherwise, denominating the client as a transmitting device and the wireless cell as a receiving device;
    the receiving device detecting at least one of a noise source signal strength, a noise source transmission activity, the transmitting device signal to a noise source signal ratio, the transmitting device signal strength, the data throughput, an error rate, and a retransmission rate for each one channel of the plurality of channels; and
    assigning one channel of the plurality of channels to the transmitting device and the receiving device responsive to detecting.

2. The method of claim 1, wherein assigning comprises assigning one channel different from any other channel having a noise source signal strength greater than a predetermined threshold.

3. The method of claim 1, wherein assigning comprises assigning one channel of the plurality of channels having the transmitting device signal to the noise source signal ratio greater than a predetermined threshold.

4. The method of claim 1, wherein assigning comprises assigning one channel of the plurality of channels having the transmitting device signal strength greater than a predetermined threshold.

5. The method of claim 1, wherein assigning comprises assigning one channel of the plurality of channels having the data throughput greater than a predetermined threshold.

6. The method of claim 1, wherein assigning comprises assigning one channel of the plurality of channels having the error rate less than a predetermined threshold.

7. The method of claim 1, wherein assigning comprises assigning one channel of the plurality of channels having the retransmission rate less than a predetermined threshold.

8. The method of claim 1, wherein assigning comprises assigning one channel of the plurality of channels having the noise source transmission activity less than a predetermined threshold.

9. A method, performed by a wireless cell and a client, for improving a data throughput between the wireless cell and the client, the method comprising:
    establishing wireless communication between the wireless cell and the client using a first channel of a plurality of channels;
    detecting the data throughput for data received by the wireless cell and data received by the client for each one channel of the plurality of channels, wherein for each channel if the data throughput received by the wireless cell is greater than the data throughput received by the client, denominating the wireless cell as a receiving device and the client as a transmitting device, otherwise, denominating the wireless cell as the transmitting device and the wireless client as the receiving device;
    denominating one channel of the plurality of channels receiving a highest data throughput as a receiving channel; and
    assigning a primary direction of data flow, wherein a majority of data communicated between the wireless cell and the client is transmitted from the transmitting device to the receiving device using the receiving channel.

10. The method of claim 9, further comprising the receiving device monitoring data throughput, wherein when the data throughput decreases below a predetermined threshold, the wireless cell and the client repeat detecting, denominating, and assigning.

11. The method of claim 9, further comprising the transmitting device monitoring the data throughput, wherein when the data throughput decreases below a predetermined threshold, the wireless cell and the client repeat detecting, denominating, and assigning.

12. A method, performed by a wireless cell and a client, for improving a data throughput between the wireless cell and the client, the method comprising:

establishing wireless communication between the wireless cell and the client using a first channel of a plurality of channels;

determining a primary direction of data flow between the wireless cell and the client, wherein if the primary direction of data flow is from the wireless cell to the client, denominating the wireless cell as a transmitting device and the client as a receiving device, otherwise, denominating the client as a transmitting device and the wireless cell as a receiving device;

the receiving device detecting at least one of a noise source signal strength, a noise source transmission activity, the transmitting device signal to a noise source signal ratio, the transmitting device signal strength, the data throughput, an error rate, and a retransmission rate for each one channel of the plurality of channels;

assigning one channel of the plurality of channels to the transmitting device and the receiving device responsive to detecting;

monitoring performed by the receiving device and the transmitting device for a change greater than a predetermined threshold in at least one of the primary direction of data flow, the noise source signal strength, the noise source transmission activity, the data throughput, the error rate, and the retransmission rate; and repeating detecting and assigning when detecting detects the change.

13. A method, performed by a wireless cell and a client, for improving a data throughput between the wireless cell and the client, the method comprising:

determining a primary direction of data flow between the wireless cell and the client, the wireless cell having a plurality of channels; and at least two directional antennas, the client having an omni-directional antenna, and wherein if the primary direction of data flow is from the wireless cell to the client, denominating the wireless cell as a transmitting device and the client as a receiving device, otherwise, denominating the client as a transmitting device and the wireless cell as a receiving device;

the receiving device detecting the data throughput repeating detecting for each one of the directional antennas and each one of the channels; and assigning one of the directional antennas and one of the plurality of channels that provides a highest data throughput.

14. The method of claim 13, further comprising the receiving device monitoring the data throughput, wherein when the data throughput decreases below a predetermined threshold, the wireless cell and the client repeat detecting, repeating, and assigning.

15. The method of claim 13, further comprising the transmitting device monitoring the data throughput, wherein when the data throughput decreases below a predetermined threshold, the wireless cell and the client repeat detecting, repeating, and assigning.

16. The method of claim 13, further comprising positioning, wherein a user positions the receiving device relative to a noise source, wherein a signal from the noise source passes through an object that attenuates the signal before the signal reaches the receiving device.

17. The method of claim 13, further comprising positioning, wherein a user positions the receiving device relative to a noise source, wherein a signal from the noise source passes through a wall before the signal reaches the receiving device.

18. A method, performed by a wireless cell and a client, for improving a data throughput between the wireless cell and the client, the method comprising:

determining a primary direction of data flow between the wireless cell and a the client, the wireless cell having a plurality of channels and an omni-directional antenna, the client having at least two directional antennas, and wherein if the primary direction of data flow is from the wireless cell to the client, denominating the wireless cell as a transmitting device and the client as a receiving device, otherwise, denominating the client as a transmitting device and the wireless cell as a receiving device;

the receiving device detecting the data throughput;

repeating detecting for each one of the directional antennas and each one of said the channels; and assigning one of the directional antennas and one of the channels that provides a highest data throughput.

19. The method of claim 18, further comprising the receiving device monitoring the data throughput, wherein when the data throughput decreases below a predetermined threshold, the wireless cell and the client repeat detecting, repeating, and assigning.

20. The method of claim 18, further comprising the transmitting device monitoring the data throughput, wherein when the data throughput decreases below a predetermined threshold, the wireless cell and the client repeat detecting, repeating, and assigning.

21. The method of claim 18, further comprising positioning, wherein a user positions the receiving device relative to a noise source, wherein a signal from the noise source passes through an object that attenuates the signal before the signal reaches the receiving device.

22. The method of claim 18, further comprising positioning, wherein a user positions the receiving device relative to a noise source, wherein a signal from the noise source passes through a wall before the signal reaches the receiving device.

* * * * *